United States Patent [19]

Nishi et al.

[11] Patent Number: 4,707,153

[45] Date of Patent: Nov. 17, 1987

[54] PRINTER CONTROLLER

[75] Inventors: Tomoya Nishi, Hadano; Mitsuhiro Amari, Atsugi; Kenji Suzuki, Hadano, all of Japan

[73] Assignee: Hitachi, Ltd., Tokyo, Japan

[21] Appl. No.: 908,661

[22] Filed: Sep. 17, 1986

[30] Foreign Application Priority Data

Sep. 30, 1985 [JP] Japan .............................. 60-217167

[51] Int. Cl.[4] .............................................. B41J 3/02
[52] U.S. Cl. .................................... 400/121; 340/731; 101/93.04; 400/76
[58] Field of Search ................... 400/121, 119, 61, 76; 101/93.04, 93.05; 340/731; 178/30; 400/582, 583

[56] References Cited

U.S. PATENT DOCUMENTS

| 4,090,188 | 5/1978 | Suga | 340/731 X |
| 4,107,786 | 8/1978 | Masaki | 340/731 X |
| 4,241,340 | 12/1980 | Raney | 340/731 |
| 4,447,888 | 5/1984 | Kuecker | 340/731 X |
| 4,488,827 | 12/1984 | Haganuma | 400/121 X |
| 4,563,677 | 1/1986 | Seiler | 340/731 X |
| 4,591,846 | 5/1986 | Koos | 340/731 X |
| 4,602,880 | 7/1986 | Oba | 400/121 |
| 4,627,749 | 12/1986 | Meo | 400/121 |
| 4,655,622 | 4/1987 | Aoki | 400/121 |

FOREIGN PATENT DOCUMENTS 34725 11/1980 Japan .................................. 400/121

Primary Examiner—Paul T. Sewell
Attorney, Agent, or Firm—Antonelli, Terry & Wands

[57] ABSTRACT

The line size of character lines constituting a page of print paper is compared with the limited line size. If a line has its line size larger than the limited line size, it is divided into several lines having a smaller line size. An edit control circuit appends a divisional character code to each divided portion of a character which is divided into several lines. An expansion control circuit receives a divisional character code, extracts the divided portion of the character from the patterns of available characters and writes it into a line buffer memory. Patterns in the line buffer memory are written sequentially into a page memory which stores patterns of characters printed in a page of print paper.

7 Claims, 14 Drawing Figures

PRINTER CONTROLLER

BACKGROUND OF THE INVENTION

This invention relates to a printer controller which generates character patterns from character codes for printing, and particularly to a printer controller which is capable of printing characters in variable character size.

In the conventional printer controller with the ability of printing characters in variable size, lines of characters to be printed and the vertical dimension of the lines of characters (will be termed "line size" hereinafter) are memorized. The stored lines of characters are printed in the specified line sizes by enlarging or reducing original character patterns retrieved from the character pattern memory and by writing the reformed character patterns into a page memory 8 which corresponds to a page of print paper as shown in FIG. 1. The term "character" in this specification includes a Kanji character, an alphanumeric character, a symbolic character, etc.

Fast setting of character patterns in the page memory 8 in response to input character codes requires a line buffer memory which is made up of a relatively expersive fast-access memory device. A character pattern is once held in the line buffer memory and, after adjustment of character position, the contents of the line buffer memory are transferred to the page memory. The line buffer memory needs to have a line size which covers the maximum possible line size (e.g., shown by Q in FIG. 1), and therefore the line buffer memory has an increased capacity, namely an increased cost, as characters are printed in a larger line size. This type of printer controller is disclosed, for example, in JP-A-No.-55-34725.

SUMMARY OF THE INVENTION

An object of this invention is to provide a printer controller which allows the line buffer memory to have a line size which is smaller than the maximum line size of character lines to be printed.

In the inventive printer controller, a line of characters having a line size larger than the limited line size dependant on the line buffer memory is divided into several smaller-sized lines, which have their character patterns set dividedly in the page memory via the line buffer memory, whereby the line buffer memory can have a smaller line size, i.e., reduced memory capacity, than the maximum line size of characters to be printed.

DESCRIPTION OF THE PREFERRED EMBODIMENT

Figure 2:
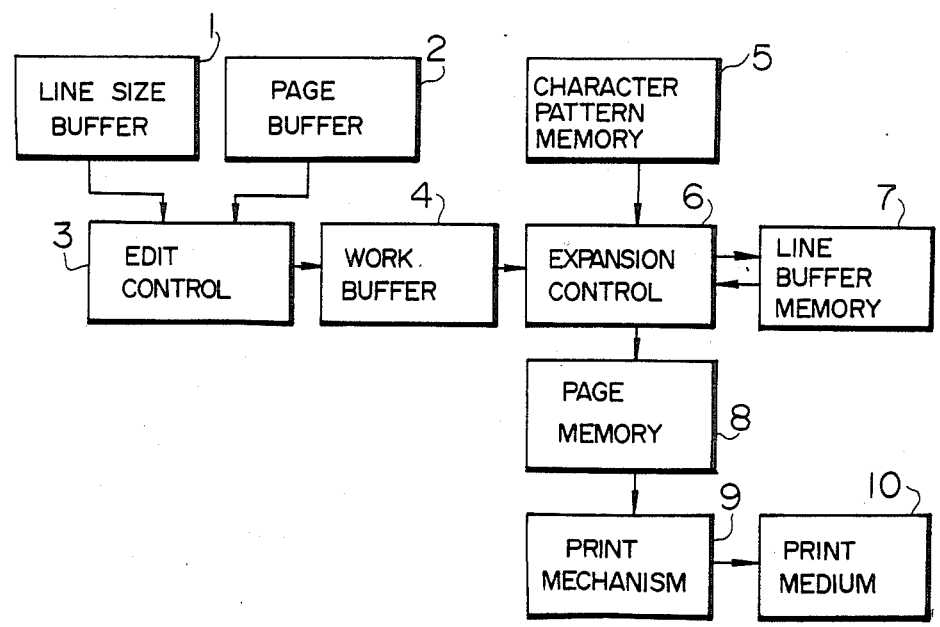
FIG. 2 is a block diagram of the printer controller embodying the present invention.

An embodiment of this invention will now be described with reference to the drawings. In FIG. 2 showing in block diagram an embodiment of the inventive printer controller, a line size buffer 1 stores information on the line sizes of all lines within a print page, and a page buffer 2 stores lines of characters to be printed in the form of character codes. An edit control circuit 3 combines the line size information with character codes of the corresponding line basing on the information retreived from the line size buffer 1 and page buffer 2. The edit control circuit 3 also implements the line division process for a character line having a larger line size beyond the line size buffer. A work buffer 4 holds the result of the combining and line division processes implemented by the edit control circuit 3. A character pattern memory 5 stores the original patterns of the whole character set in the form of dot-matrix patterns, and it provides an original character pattern in response to the entry of a corresponding character code. An expansion control circuit 6 receives a character code in the combined information retrieved from the work buffer 4 and passes it on to the character pattern memory 5 to acquire a corresponding character pattern. The expansion control circuit 6 writes character patterns in the form of a bit map into the memory (this process will be called "character expansion process"). A line buffer memory 7 is used as a temporary storage for the character expansion process by the expansion control circuit 6. A page memory 8 has a capacity of one print page, with a bit of the memory corresponding to a dot printed on the print paper. The line buffer memory has its contents transferred to the page memory 8 upon completion of each character expansion process by the expansion control circuit 6 for the line buffer memory 7. The contents of the page memory 8 are read out by a printing mechanism 9, such as a laser printing mechanism, and printed on a printing medium 10 such as print paper.

Figure 3:
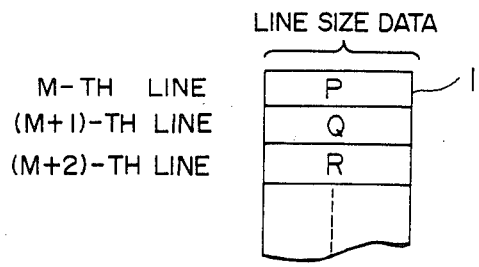
FIG. 3 is a diagram explaining the contents of the line size buffer 1 shown in FIG. 2.

FIG. 3 explains the line size buffer 1 shown in FIG. 2. The line size buffer 1 stores the line size of all character lines within a page, in such a way of line size P for the Mth line, line size Q for the M+1th line and line size R for the M+2th line. The line size can be expressed, for example, in terms of the number of dots used in the vertical direction of the line.

Figure 4:
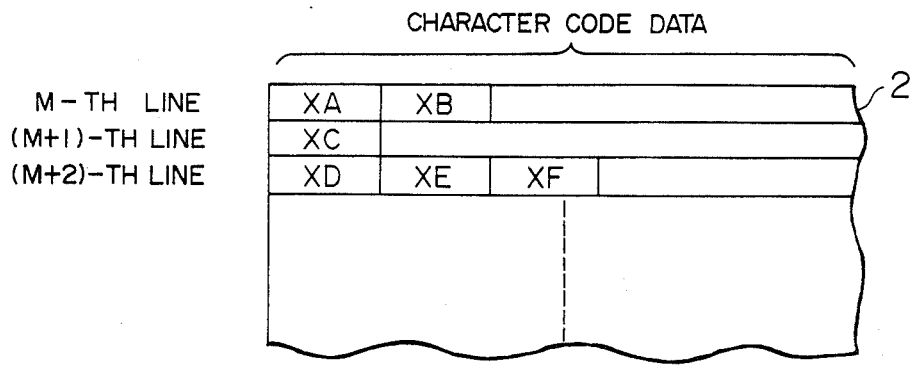
FIG. 4 is a diagram explaining the contents of the page buffer 2 shown in FIG. 2.

FIG. 4 explains the page buffer 2 shown in FIG. 2. The page buffer 2 stores character codes of character lines to be printed in a page, in such a way of character code XA for character "A", character code XB for character "B" and character code XC for character "C". The character code has a 2-byte length in this embodiment. In the example shown in FIG. 4, the page buffer 2 stores characters "A" and "B" on the Mth line, character "C" on the M+1th line, and characters "D", "E" and "F" on the M+2 line.

The edit control circuit 3 in FIG. 2 examines the line size of all lines within the print page and implements the line division process for lines having line sizes larger than the limited line size so that an excessively-sized line is divided into several smaller-sized lines. The edit control circuit 3 combines the line size information with character codes and implements the line division process, and writes the result into the work buffer 4.

Figure 9A:
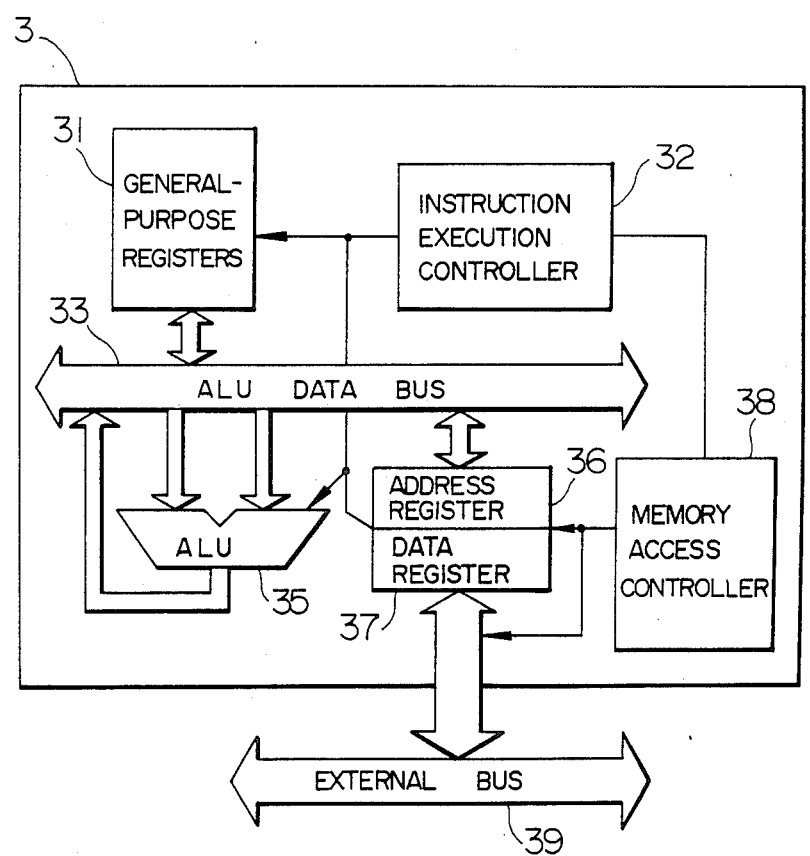
FIG. 9a is a block diagram showing in detail the edit control circuit 3 shown in FIG. 2.

In FIG. 9a showing in block diagram the arrangement of the edit control circuit 3, general-purpose registers 31 hold various data. An instruction execution controller 32 interprets a program executed by the edit control circuit 3 and produces various control signals.

An internal data bus 33 is used to transfer data within the edit control circuit 3. An arithmetic logic unit (ALU) 35 performs arithmetic and logic operations for the contents of the general-purpose registers 31. An address register 36 and data register 37 are used when the memory is accessed. A memory access controller 38 controls the interface between the edit control circuit 3 and memories 1, 2 and 4. An external bus 39 is used for data transaction with the memories 1, 2 and 4.

Figure 9B:
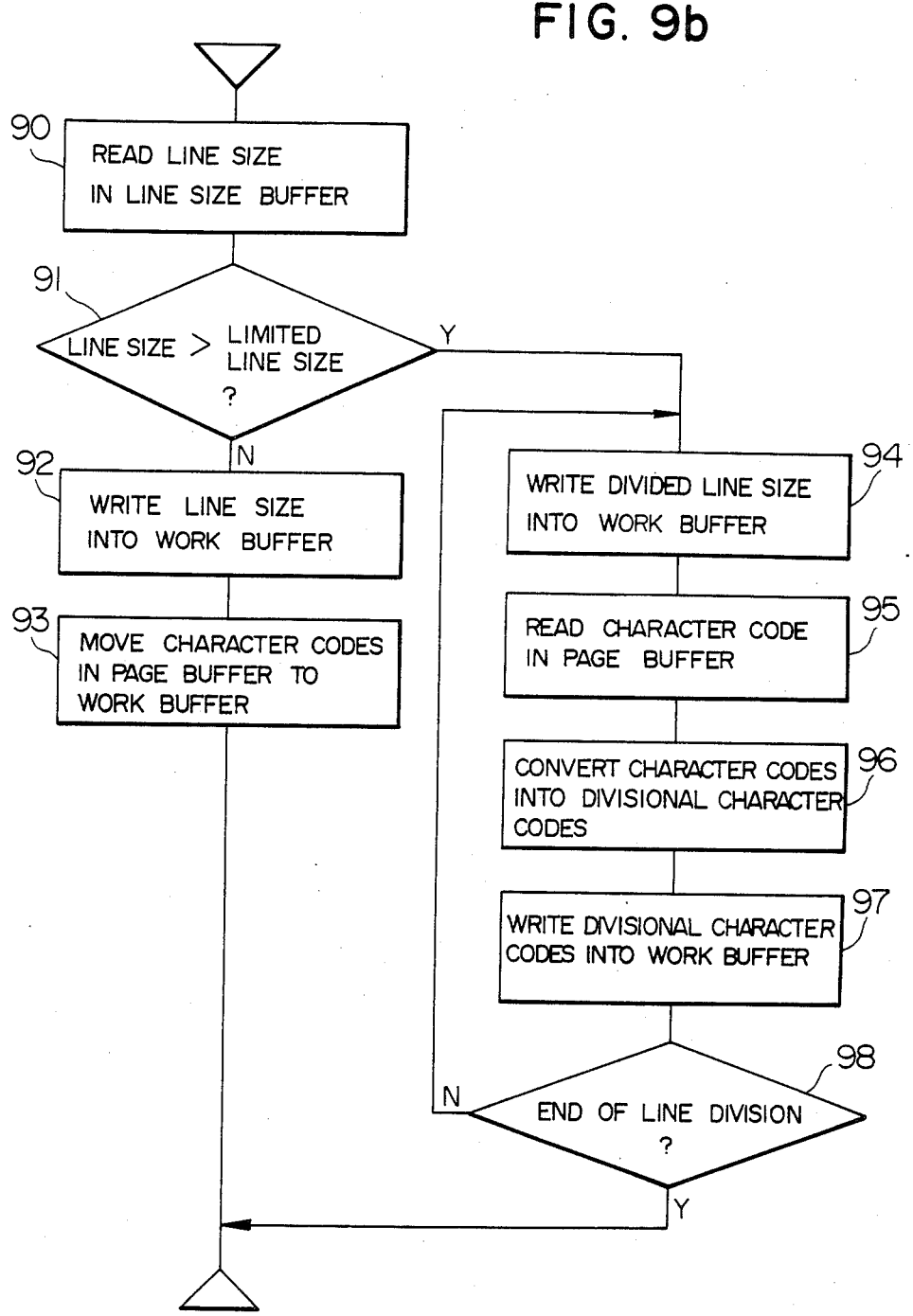
FIG. 9b is a flowchart showing the operating procedure of the edit control circuit 3.

Next, the operation of the edit control circuit 3 will be described with reference to the flowchart of FIG. 9b. The edit control circuit 3 reads the line size stored in the line size buffer 1 into the data register 37 by way of the external bus 39 (step 90 in FIG. 9b), and operates on the ALU 35 to compare it with the limited line size (step 91). If the line size is smaller than or equal to the limited line size, it is left in the data register 37 and at the same time transferred to the work buffer 4 by way of the external bus 39 (step 92). Subsequently, character codes of the corresponding line are read out of the page memory 2 into the work buffer 4 (step 93). The edit control circuit 3 has thus produced the first combinational information from the line size information set in the work buffer 4 in step 92 and the character codes set in the work buffer 4 in step 93.

If, on the other hand, the line size is found larger than the limited line size, it is divided into several smaller lines. Initially, the line size of the first line after line division is set in the work buffer 4 (step 94). Next, a character code of the line before line division is read out of the page buffer 2 into the data register 37 by way of the external bus 39 (step 95), and the ALU 35 is operated on to convert the character code into another character code (will be termed "divisional character code") indicative of the portion in the divided line of the character pattern for the character code before division (step 96). Divisional character codes may be set in advance in correspondence to the divided protions of each character, or as in this embodiment divisional character codes may be produced by appending control codes indicative of the divided portions of characters to their character codes before division. For example, when a character to be converted has its pre-divisional character code expressed as $1D3F ($ indicates hexadecimal) and its control code indicative of the upper half portion of the character expressed as $000A, the divisional character code will be expressed as $000A1D3F. The converted divisional character code is set in the data register 37, and then written into the work buffer 4 by way of the external bus 39 (step 97). These operations are repeated for all divisional lines (step 98). The edit control circuit 3 has thus produced the second combinational information from the line size information set in the work buffer 4 in step 94 and the divisional character codes set in the work buffer 4 in step 97.

Figure 5:
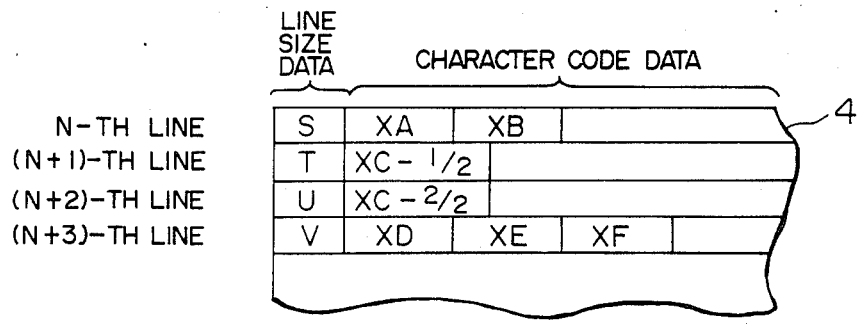
FIG. 5 is a diagram explaining the contents of the work buffer 4 shown in FIG. 2.

FIG. 5 explains the work buffer 4. The work buffer 4 stores the result of combinational process and line division process implemented by the edit control circuit 3 by making reference to the line size buffer 4 shown in FIG. 3 and the page buffer 2 shown in FIG. 4. In FIG. 5, the Nth line has line size S, and in this way the N+1th, N+2th and N+3th lines have line sizes T, U and V, respectively. Character code XA represents character "A", and in this way character codes XB, XD, XE and XF represent characters "B", "D", "E" and "F", respectively.

The character "C" is divided equally into an upper and lower dot patterns, which are represented by divisional character code XC-$\frac{1}{2}$ on the N+1th line and XC-2/2 on the N+2th line, respectively. The M+1th line is thus divided into the N+1th and N+2th lines in the work buffer 4, which contains on these lines the second combinational information produced by the edit control circuit 3. The Mth and M+2th lines in the page buffer 2 appear unchanged on the Nth and N+3th lines in the work buffer 4, which contains on these lines the first combinational information produced by the edit control circuit 3. The line sizes in these buffers have the correspondence of S=P, T=U=Q/2, and V=R. The character "C" having the pre-divisional character code XC is converted to have divisional character codes XC-$\frac{1}{2}$ and XC-2/2.

The expansion control circuit 6 in FIG. 2 implements the character expansion process in accordance with the contents of the work buffer 4. Based on the line size and character codes or divisional character codes for a line stored in the work buffer 4, the expansion control circuit 6 reads a character pattern out of the character pattern memory 5 into the line buffer memory 7. Since the contents of the work buffer 4 have line sizes smaller than the limited line size through the above line division process, the line buffer memory has a line size equal to the limited line size at most. The line buffer memory 7 has a capacity in regard to the horizontal dimension of the print paper (will be termed "width") which is made equal to the number of parallel bits in reading or writing the page memory 8. For example, when the page memory 8 has a 32-bit parallel access, the line buffer memory is provided with a 32-bit width.

Figure 6A:
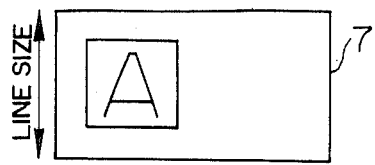
FIGS. 6a, 6b, 7a and 7b are diagrams explaining the character expansion for the line buffer memory according to the present invention.
Figure 6B:
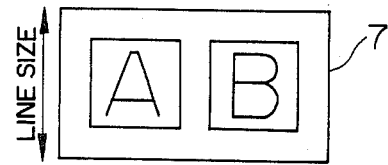

FIG. 6a shows the contents of the line buffer memory 7 after the expansion control circuit 6 has written a character pattern of "A" into the line buffer memory 7 in compliance with the Nth line of the work buffer 4. FIG. 6b shows the contents of the line buffer memory 7 after the expansion control circuit 6 has read the contents of line buffer memory 7 shown in FIG. 6a and, after combining it with a character pattern of "B" which has been retrieved from the character pattern memory 5, stored the result back into the line buffer memory 7. Upon completion of the writing operation for the one line by the expansion control circuit 6 into the line buffer memory 7, the contents of the line buffer memory 7 are transferred to the page memory 8.

Figure 10A:
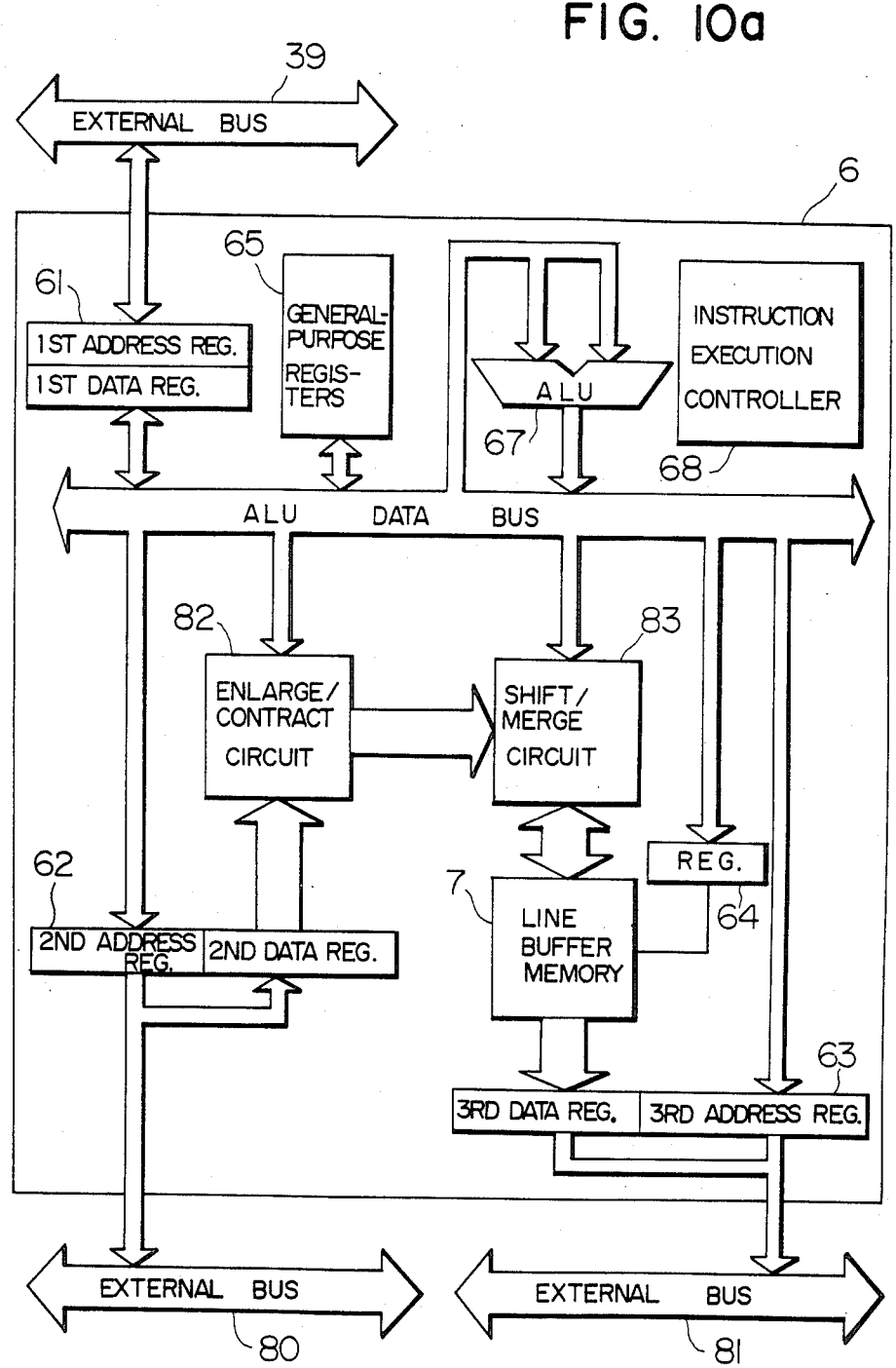
FIG. 10a is a block diagram showing in detail the expansion control circuit 6 shown in FIG. 2.

In FIG. 10a showing in block diagram the arrangement of the expansion control circuit 6, a set of first address register and data register 61 is used by the expansion control circuit 6 in reading the work buffer 4 by way of the external bus 39. A set of second address register and data register 62 is used by the expansion control circuit 6 in reading the character pattern memory 5 by way of the external bus 80. A set of third address register and data register 63 is used by the expansion control circuit 6 in writing a character pattern into the page memory 8 by way of the external bus 81. A line buffer address register 64 indicates the address of the line buffer memory 7 in the read or write operation. Reference numeral 65 denotes general-purpose registers, 67 denotes an arithmetic logic unit (ALU), and 68 denotes an instruction execution controller. External buses 80 and 81 are used for data transfer between the expansion control circuit 6 and the memories 5 and 8. An enlargement/contraction circuit 82 implements enlargement or reduction of a character pattern retrieved from the character pattern memory 5 by the expansion control circuit 6. A shift/merge circuit 83 implements shifting for a character pattern enlarged or reduced by the enlargement/contraction circuit 82 and merging for a character pattern stored in the line buffer memory 7 with an enlarged or reduced character pattern.

Figure 10B:
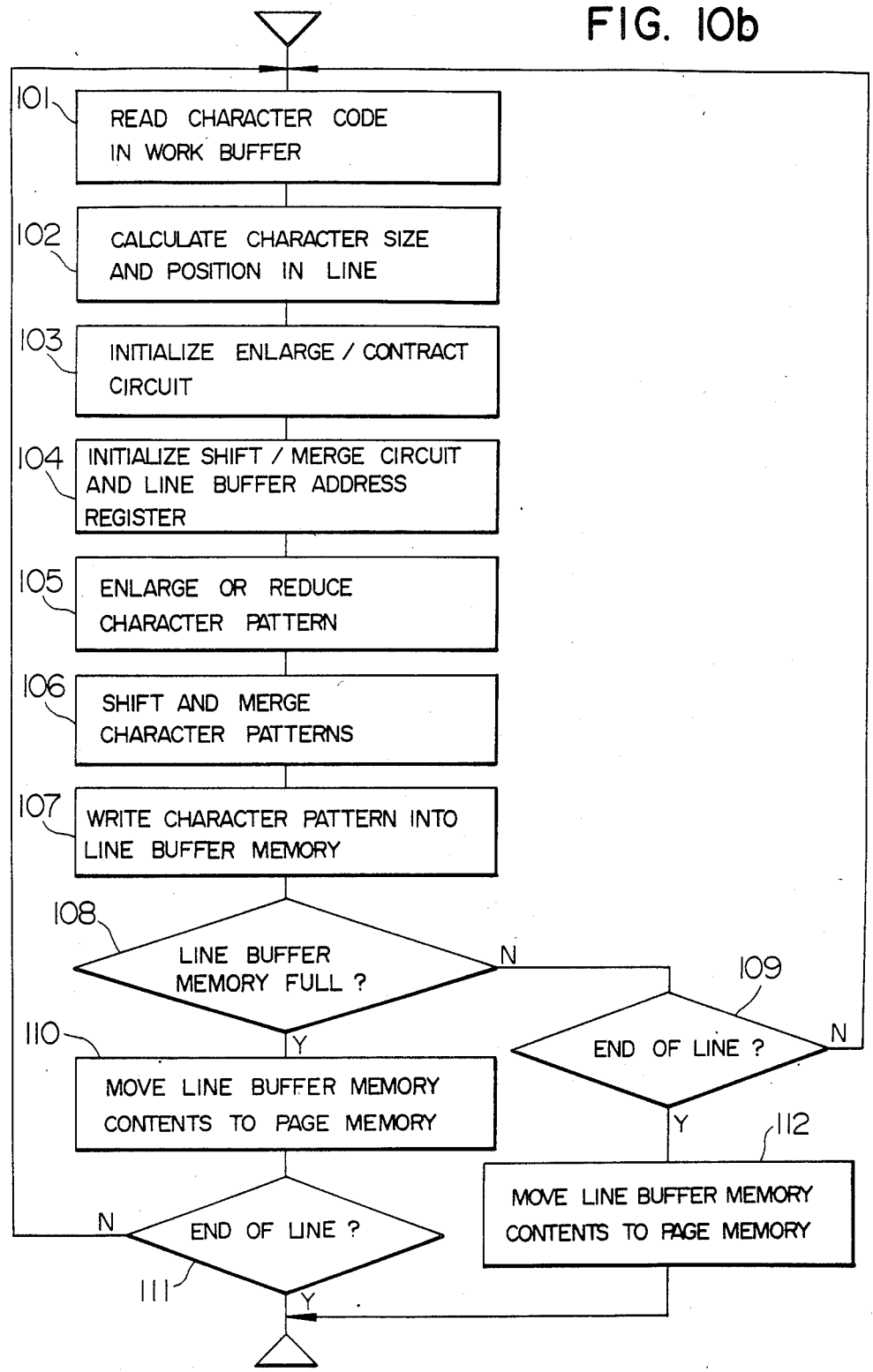
FIG. 10b is a flowchart showing the operating procedure of the expansion control circuit 6.

Next, the operation of the expansion control circuit 6 will be described with reference to the flowchart of FIG. 10b. The expansion control circuit 6 reads the line size in the combinational information for one line in the work buffer 4 into the data register 61 by way of the external bus 39, and further saves it into the general-purpose registers 65. Thereafter, the expansion control circuit 6 reads a character code in the combinational information in the work buffer 4 into the data register 61 by way of the external bus 39 (step 101). In case the character code is a divisional character code, the ALU 67 is operated on to calculate the character size and the position of the character pattern in the line so that the divided portion (e.g., upper half or lower half) of the character represented by the divisional character code is contained within the line buffer memory 7; otherwise, when the character code is not a divisional character code, the ALU 67 is operated on to calculate the character size in compliance with the line size (step 102). Next, the enlargement/contraction circuit 82 is initialized for the operation (step 103). The shift/merge circuit 83 and line buffer address register 64 are also initialized so that they are ready to write the character pattern into the line buffer memory 7 (step 104). Subsequently, the character pattern in the character pattern memory 5 is read out to the data register 62 by way of the external bus 80, and it is enlarged or reduced depending on the line size by the enlargement/contraction circuit 62 (step 105), shift depending on its position within the line by the shift/merge circuit 83, merged with the contents of the line buffer memory 7 which has already be written (step 106), and written into the line buffer memory 7 (step 107). Next, it is tested whether the line buffer memory 7 is filled with character patterns (step 108), and if it is found full, its contents are transferred to the page memory 8 (step 110). These operations are repeated until character patterns of one complete line are written into the page memory 8 (step 111). If the line buffer memory 7 is not yet filled with character patterns, the character pattern writing operation is repeated until it is full (step 109). At the end of a line, even if the line buffer memory 7 is not full, its contents are transferred to the character pattern memory 8 (step 112).

Figure 7A:
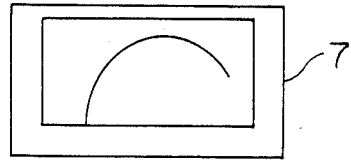
Figure 7B:
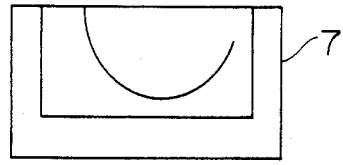

FIG. 7a shows the contents of the line buffer memory 7 after the expansion control circuit 6 has read an original character pattern in accordance with the contents of the N+1th line of the work buffer 4 in FIG. 5 from the character pattern memory 5 into the line buffer memory 7. Similarly, FIG. 7b shows the result of writing a character pattern into the line buffer memory 7 in accordance with the contents of the N+2th line of the work buffer 4 in FIG. 5. Upon completion of writing into the line buffer memory 7 by the expansion control circuit 6, the contents of the line buffer memory 7 are transferred to the page memory 8.

Figure 1:
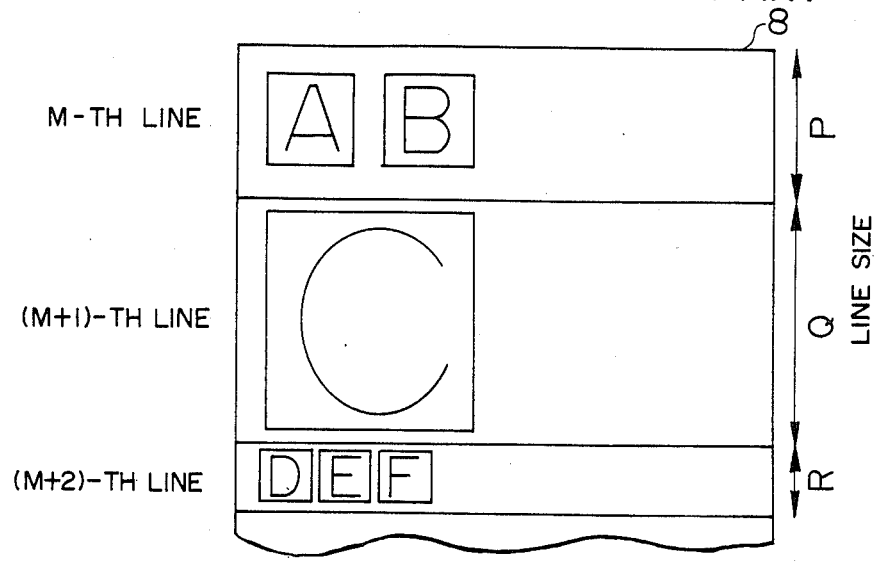
FIG. 1 is a diagram explaining the character size expansion for the page memory according to the conventional printer controller.
Figure 8:
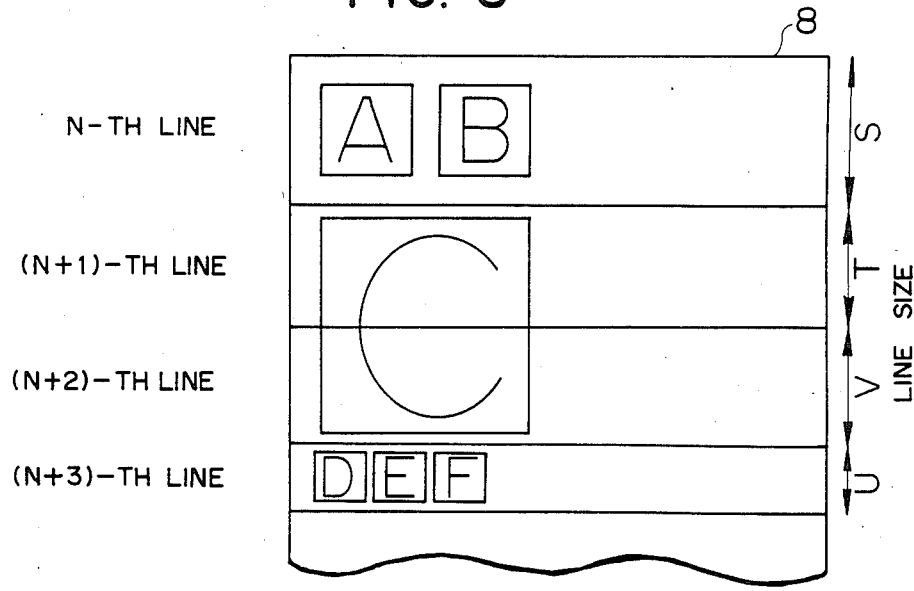
FIG. 8 is a diagram explaining the character expansion for the page memory according to the present invention.

FIG. 8 shows the result of writing character patterns into the page memory 8 in accordance with the contents of the work buffer 4 in FIG. 5. In FIG. 8, the character patterns of "A" and "B" are written on the Nth line, the upper half of the character pattern of "C" is written on the N+1th line, its lower half is written on the N+2th line, and the character patterns of "D", "E" and "F" are written on the N+3th line. The page memory 8 which has been written character patterns in accordance with the work buffer 4 after the line division process has exactly the same contents, shown in FIG. 8, as of the conventional page memory 8 in FIG. 1 which has been written character patterns in accordance with the line size buffer 1 in FIG. 3 and the page buffer 2 in FIG. 4 without the line division process.

According to this invention, as described above, character patterns are written into the page memory following the line division process, which allows the temporary line buffer memory to have a smaller line size, and its capacity can be reduced.

We claim:

1. A printer controller operating on a printer to print characters on a printing medium by generating patterns of the characters in accordance with character codes of the characters, said controller comprising:

a line size buffer which stores line size information for character lines constituting a page of the printing medium on character line basis;

a page buffer which stores character codes of character lines to be printed in a page of the printing medium;

editing control means connected to said line size buffer and said page buffer and operative to produce combinational information from the line size information and the character codes, said editing control means comparing a line size stored in said line size buffer with a limited line size, producing a first combinational information by combining the line size information with character codes of a corresponding line in said page buffer if the line size is found smaller than the limited line size as a result of comparison, dividing the line into a plurality of lines having a line size smaller than the limited line size if the line size is found larger than the limited line size, and producing a second combinational information by combining line size information of divided lines with divisional character codes expressing divided portions in the divided line of characters in said page buffer;

a character pattern memory which stores patterns of characters available for printing;

a page memory which stores patterns of characters to be printed in a page of the printing medium;

a line buffer memory which serves as a temporary storage for writing character patterns into said page memory, said line buffer memory having a line size equal to or larger than the limited line size; and expansion control means connected to said editing control means and said character pattern memory, said expansion control means being operative, after expanding character patterns of character codes in said first combinational information into said line buffer memory using character patterns in said character pattern memory in response to said first combinational information and after expanding divided portions of character patterns of divisional character codes in said second combinational information into said line buffer memory using character patterns in said character pattern memory in response to said second combinational information, to write the expanded character patterns into said page memory.

2. A printer controller according to claim 1 further comprising a working buffer located between said editing control means and said expansion control means and operative to store said first and second combinational information produced by said editing control means.

3. A printer controller according to claim 1, wherein said expansion control means is operative to adjust the line size of character patterns expanded into said line buffer memory in accordance with line size information in said first and second combinational information.

4. A printer controller according to claim 1, wherein a divisional character code in said second combinational information includes a character code of a character which is subjected to division and a control code indicating a divided portion.

5. A printer controller according to claim 1, wherein said editing control means is operative to equally divide a line into a plurality of lines in producing said second combinational information.

6. A printer controller according to claim 1, wherein said character pattern memory has a record of dot-matrix patterns of characters available for printing.

7. A method of controlling a printer which prints characters on a printing medium by generating patterns of the characters in accordance with character codes of the characters, said method comprising the steps of:
- storing line size information of character lines constituting a page of the printing medium;
- storing character codes of character lines to be printed in a page of the printing medium on character line basis;
- comparing a line size stored in the line size buffer with a limited line size;
- producing first combinational information by combining the line size information with character codes of a corresponding line in the page buffer if the line size is found smaller than the limited line size as a result of comparison;
- dividing the line into a plurality of lines having a line size smaller than the limited line size if the line size is found larger than the limited line size;
- producing second combinational information by combining line size information of divided lines with divisional character codes expressing divided portions in the divided lines of characters in the page buffer;
- expanding character patterns of character codes in said first combinational information into the line buffer memory and writing the expanded character patterns into a page memory;
- expanding divided portions of character patterns of divisional character codes in said second combinational information into the line buffer memory and writing the expanded result into the page memory; and
- printing the character patterns in the page memory on the printing medium.

* * * * *